Feb. 22, 1955 H. SHAPIRO 2,702,885
SUPERSONIC DELAY LINE
Filed April 17, 1946
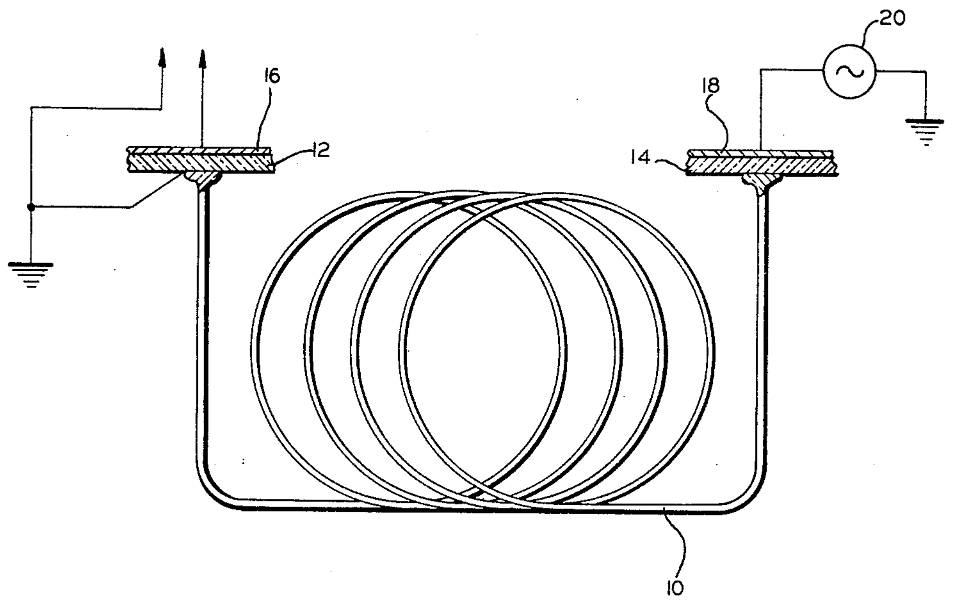
INVENTOR
HERBERT SHAPIRO
BY M. O. Hayes
ATTORNEY

United States Patent Office 2,702,885

Patented Feb. 22, 1955

2,702,885

SUPERSONIC DELAY LINE

Herbert Shapiro, Cambridge, Mass., assignor, by mesne assignments, to the United States of America as represented by the Secretary of the Navy Application April 17, 1946, Serial No. 662,685

6 Claims. (Cl. 333—30)

This invention relates to a supersonic delay line and more particularly to a novel quartz supersonic delay line.

Heretofore, supersonic delay lines were bulky and required considerable space. Furthermore many were constructed such that there was considerable attenuation of the supersonic energy passing through the line. A delay line as contemplated by this invention requires very little space and provides a lower attenuation of the supersonic energy being transmitted than those previously known in the art.

It is accordingly an object of this invention to provide a quartz delay line.

A further object of this invention is to provide a delay line consisting of a coil of quartz.

A still further object of the present invention is to provide a delay line consisting of a coil of glass.

Another object of this invention is to provide a space conserving supersonic delay line.

Still another object of this invention is to provide a supersonic delay line which minimizes the attenuation of the supersonic energy being delayed.

These and other objects of the present invention will be apparent from the following specification when taken with the accompanying drawing the single figure of which is a schematic representation of an embodiment of the invention.

Referring to the figure there is shown an embodiment of the invention suitable for use in a system using a coil of quartz or glass as a supersonic delay line. This system as herein described comprises a coil of quartz fibre 10, the enlarged ends 22 of which are covered with a metal film, and soldered to similarly treated ten to thirty megacycle quartz crystals 12 and 14. To preclude distortion of the waveform which may arise from transverse vibration or internal multiple reflections, the coil is preferably of the order of 0.5 mm. in diameter.

Quartz crystal 14, the transmitting crystal, is attached to a metal foil electrode 18 which in turn is electrically connected to a high frequency generator 20. Quartz crystal 12, the receiving crystal, is attached to a metal foil electrode 16 which in turn is electrically connected to an output terminal.

In operation, electrical energy from the high frequency generator 20 excites the piezo-electric crystal 14 which transforms the electrical energy into supersonic mechanical vibrations which are transferred through the quartz coil to the receiving crystal 12 where they are reconverted to electrical energy. Due to the high acoustic mismatch between the quartz coil and air there is no transmission of energy from one coil to the next.

It has been discovered that quartz and glass offers less attenuation to supersonic energy than materials such as metals or liquids heretofore used in the construction of supersonic delay lines.

A delay line as conceived by this invention thus provides a space conserving supersonic delay line which offers a minimum attenuation to the signal being delayed.

The invention in the foregoing specification need not be limited to the details shown which are considered to be illustrative of one form the invention may take.

What is claimed is:

1. A delay line comprising, a generator of electrical energy, a first metal foil electrode connected to said generator, a transmitting crystal having a first surface thereof attached to said first electrode and a second surface having a metallic film thereon, a coil composed of a rod of homogeneous material of diameter less than a half millimeter, the ends of said rod being enlarged and flattened, metallic films being deposited upon said enlarged flattened ends, the film at one end of said coil being attached to said second surface of said transmitting crystal, a receiving crystal having a metallic film on a first surface thereof attached to the metallic film at the other end of said coil, a second metal foil electrode attached to a second surface of said receiving crystal, and means for extracting electrical energy from said second electrode.

2. Apparatus as in claim 1 wherein said coil of material is formed of quartz.

3. Apparatus as in claim 1 wherein said coil of material is formed of glass.

4. A delay line comprising a coil composed of a rod of homogeneous supersonically conductive material having enlarged and flattened ends, each end having deposited thereon a metallic film, a first and second crystal, each crystal having on one surface thereof a metallic film, one end of said rod being attached to the metallic film of said first crystal and the other end of said rod being attached to the metallic film of said second crystal.

5. Apparatus as in claim 4 wherein said coil of material is formed of quartz.

6. Apparatus as in claim 4 wherein said coil of material is formed of glass.

References Cited in the file of this patent

UNITED STATES PATENTS

| | | |
|---|---|---|
| 1,799,634 | Norton | Apr. 7, 1931 |
| 1,852,795 | Wegel | Apr. 5, 1932 |
| 1,955,471 | Pooler | Apr. 17, 1934 |
| 2,371,613 | Fair | Mar. 20, 1945 |
| 2,375,004 | Knowles | May 1, 1945 |
| 2,418,964 | Arenberg | Apr. 15, 1947 |
| 2,421,026 | Hall et al. | May 27, 1947 |
| 2,514,080 | Mason | July 4, 1950 |

FOREIGN PATENTS

| | | |
|---|---|---|
| 711,667 | France | June 30, 1931 |